United States Patent [19]

Mori et al.

[11] Patent Number: 4,574,347

[45] Date of Patent: Mar. 4, 1986

[54] DATA PROCESSING APPARATUS FOR PERFORMING HIGH-SPEED ARITHMETIC OPERATIONS

[75] Inventors: Shosuke Mori, Tokyo; Makoto Awaga, Yokohama; Kiminori Fujisaku; Mitsuru Yamauchi, both of Inagi; Hitoshi Ono, Yokohama, all of Japan

[73] Assignee: Fujitsu Limited, Kawasaki, Japan

[21] Appl. No.: 549,472

[22] Filed: Nov. 7, 1983

[30] Foreign Application Priority Data

Nov. 8, 1982 [JP] Japan .............................. 57-194558

[51] Int. Cl.⁴ ............................................. G06F 7/38
[52] U.S. Cl. .................................................. 364/200
[58] Field of Search ........................ 364/200 MS File

[56] References Cited

U.S. PATENT DOCUMENTS 4,107,773  8/1978  Gilbreath et al. ................... 364/200

Primary Examiner—Raulfe B. Zache
Attorney, Agent, or Firm—Staas & Halsey

[57] ABSTRACT

A data processing apparatus includes a CPU, a memory, and logic operation hardware. When a predetermined instruction code is identified, the logic operation hardware executes an arithmetic operation using data stored in the memory, while the CPU processes the same data. The logic operation hardware then writes the result of the arithmetic operation instead of the data processed by the CPU.

23 Claims, 10 Drawing Figures

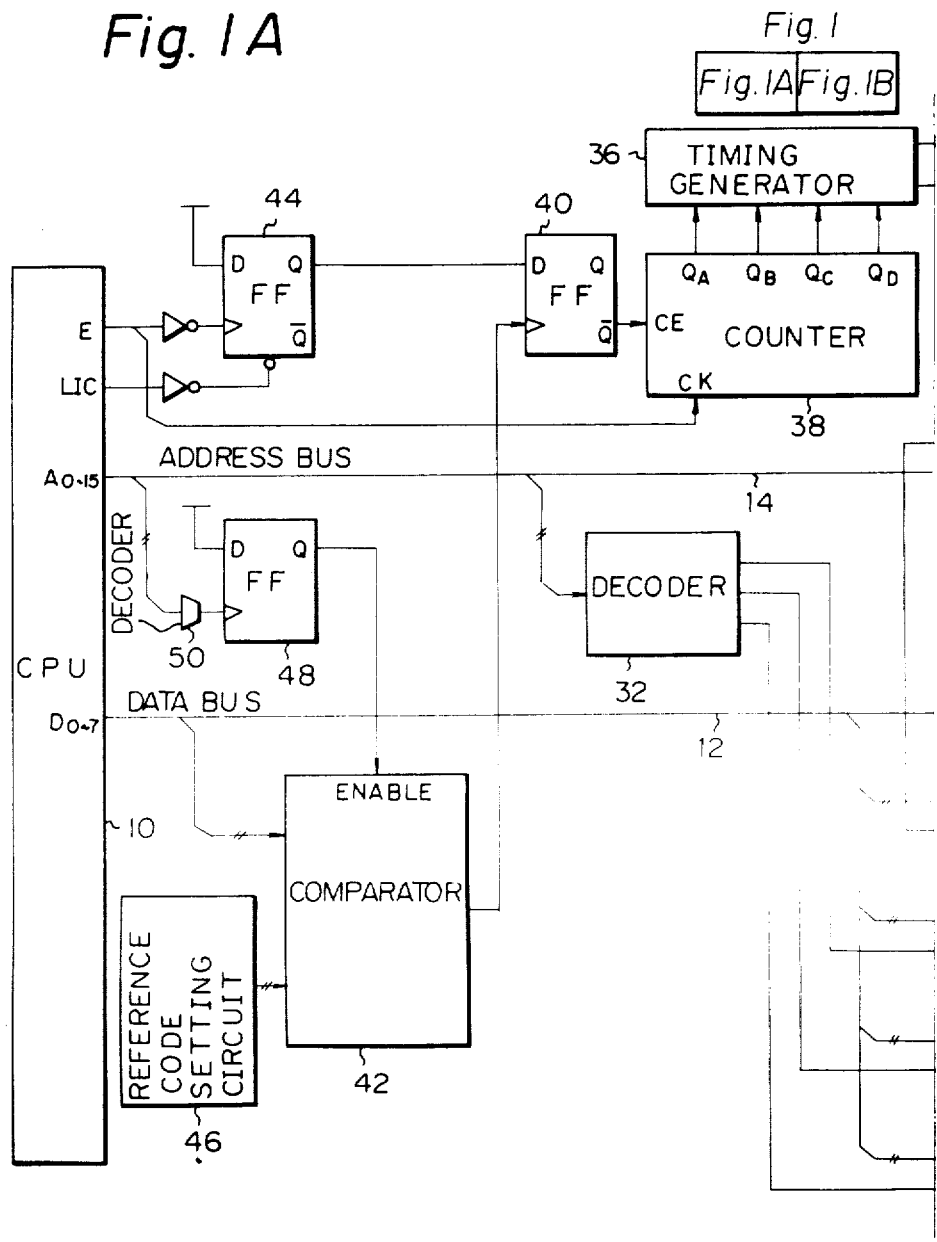

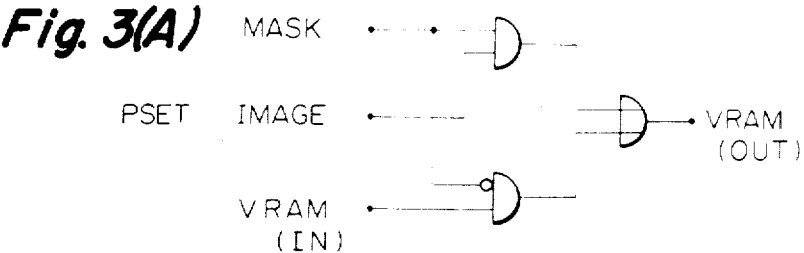
Fig. 3(A) PSET
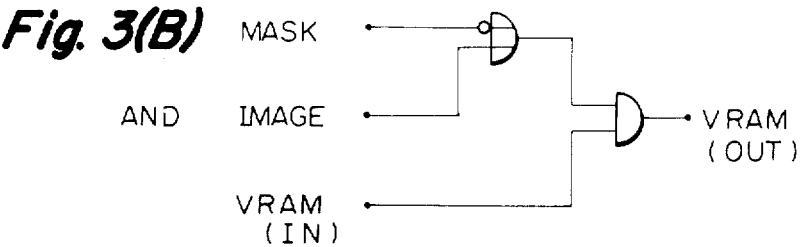
Fig. 3(B) AND
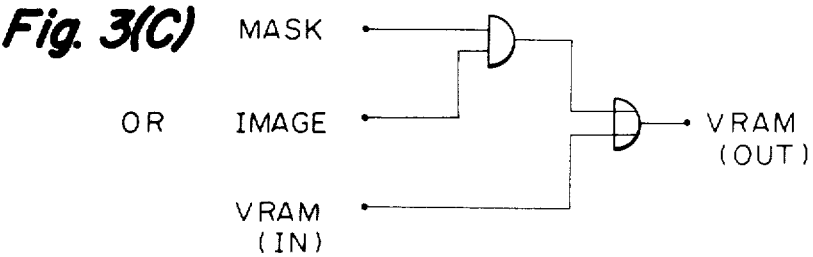
Fig. 3(C) OR
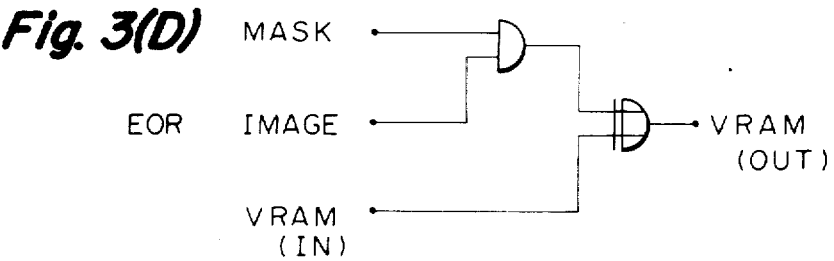
Fig. 3(D) EOR

DATA PROCESSING APPARATUS FOR PERFORMING HIGH-SPEED ARITHMETIC OPERATIONS

BACKGROUND OF THE INVENTION

1. Field of the Invention

The present invention relates to a data processing apparatus for performing high-speed arithmetic operations.

2. Description of the Prior Art

Most basic instructions in a microcomputer system or a personal computer system, especially in a computer having a cathode ray tube (CRT) graphic display system, cause the central processing unit to execute an arithmetic operation of data stored in a random access memory (RAM) and data from the central processing unit (CPU) and then store the results of the arithmetic operation in the RAM. Since such arithmetic operations have been performed by software according to the prior art, the load on the CPU becomes extremely heavy when the number of instructions requiring an arithmetic operation increases. It is also very difficult to speed up such arithmetic operations if they are performed by software. Furthermore, in the prior art, special arithmetic operation instructions, not prepared in advance in an instruction set, cannot be easily executed at high speed.

SUMMARY OF THE INVENTION

It is therefore an object of the present invention to provide a data processing apparatus which can perform high-speed arithmetic operations and can reduce the load on the CPU.

The above object is achieved by a data processing apparatus which includes a CPU and a data bus coupled to the CPU. Coupled to the data bus are: a memory for storing data from the CPU via the data bus; a circuit for identifying a predetermined instruction code, out of a plurality of instruction codes, requiring the CPU read data from or to write data in the memory; and a logic operation circuit. When the predetermined instruction code is identified, the logic operation circuit receives data from the memory via the data bus, executes an arithmetic operation on the received data to produce new data, and writes the produced data in the memory. The logic operation circuit performs the receiving through writing operations while the CPU is executing an operation corresponding to the predetermined instruction code.

According to the present invention, a logic operation circuit is provided which executes an arithmetic operation on data stored in a memory and writes the results of the arithmetic operation in the memory instead of data processed by the CPU, when a predetermined instruction code is identified. Therefore, the present invention provides high-speed arithmetic operation and reduces the CPU load. The CPU operates during the above arithmetic operation and each arithmetic operation is performed within one instruction cycle of the CPU. If the CPU had to stop its processing (wait) for the arithmetic operation of the logic operation means, considerable hardware for read/write timing and addressing would be necessary.

Since high-speed arithmetic operations can be performed, graphic display speed can be easily increased even for high-speed execution of a special instruction not included in the original instruction set.

BRIEF DESCRIPTION OF THE DRAWINGS

FIGS. 1a and 1b are a block diagram of an embodiment of the present invention;

FIGS. 3a, 3b, 3c and 3d are a diagram illustrating the operation of the logic operation circuit in FIG. 2;

DESCRIPTION OF THE PREFERRED EMBODIMENTS

Figure 1B:
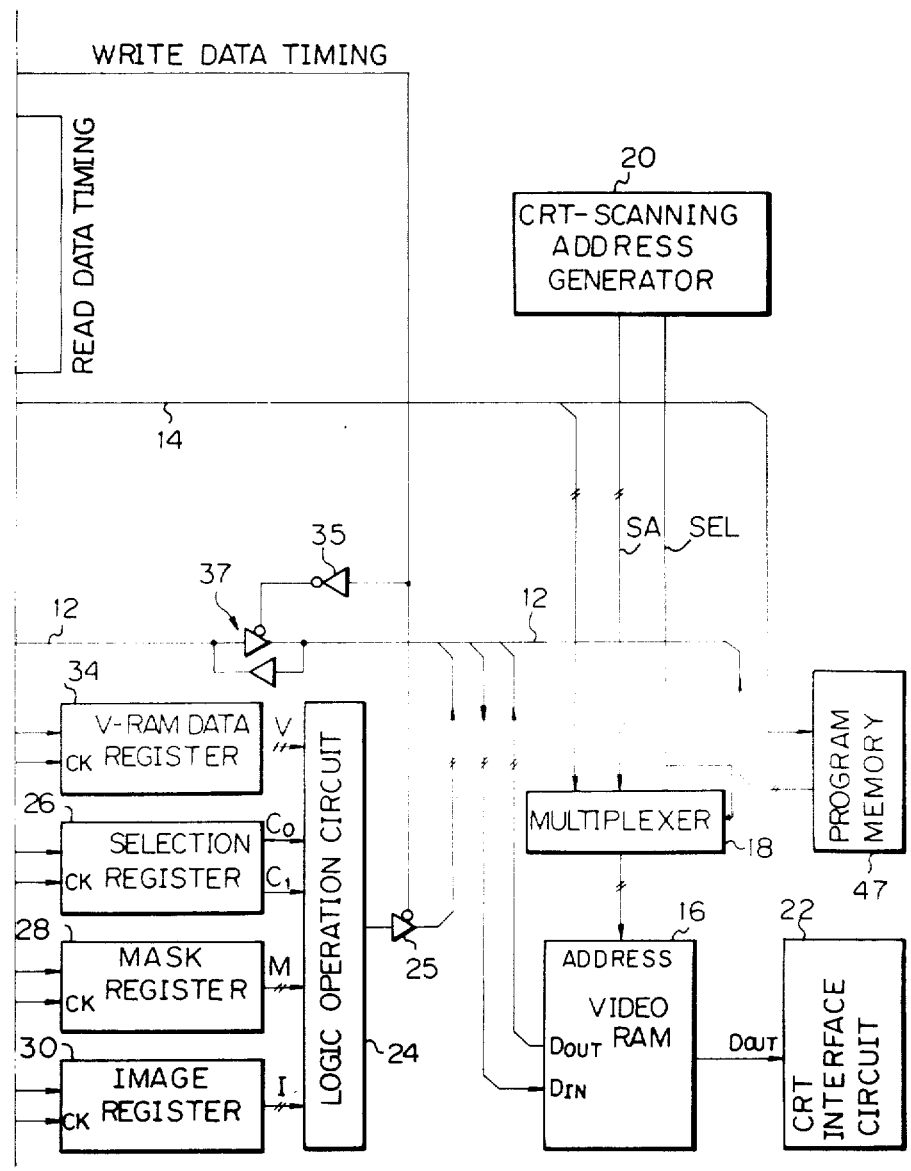

Referring to FIG. 1, reference numeral 10 denotes a CPU, 12 a data bus coupled to the CPU 10, 14 an address bus coupled to the CPU 10, and 16 a video RAM coupled to the data bus 12. A multiplexer 18 selects and feeds either a scanning address SA from a CRT-scanning address generator 20 or an address from the CPU 10 via the address bus 14 to the video RAM 16, in response to a selected signal SEL. Data stored in the video RAM 16 is output to a CRT interface circuit 22 in response to the scanning address SA from the CRT-scanning address generator 20 via the multiplexer 18. The data stored in the video RAM 16 is also output to the data bus 12, and data from the CPU 10 is written into the video RAM 16 via the data bus 12, in response at the address supplied by the CPU 10 via the address bus 14 and the multiplexer 18.

A logic operation circuit 24 executes one of various arithmetic operations using part of the data stored in the video RAM 16 and image data from the CPU 10. The results of the executed arithmetic operation are written into the video RAM 16 via a buffer 25 and the data bus 12. The detailed construction of the logic operation circuit 24 will be described later.

A selection register 26 holds two bits of selection data $C_0$ and $C_1$ which indicate what kind of arithmetic operation should be executed. Since, in this case, there are two bits of selection data, one of four arithmetic operations can be selected. A mask register 28 holds eight-bit mask data M which instructs whether to execute a masking operation for maintaining data stored in the video RAM 16 without change. An image register 30 holds eight-bit image data I which is provided by the CPU 10. Each of the selection data bits $C_0$ and $C_1$, the mask data M, and the image data I are input into their respective registers 26, 28 and 30 when a decoder 32 decodes an address corresponding to each of the registers 26, 28, and 30. In other words, each of the registers 26, 28 and 30 is assigned a respective address, and the decoder 32 decodes one of three addresses corresponding to the above registers.

A V-RAM data register 34 holds video RAM data V output by the video RAM 16. When a read data timing signal is applied by a timing generator 36, the V-RAM data register 34 obtains the video RAM data V from the data bus 12 and holds it.

The timing generator 36 also produces a write data timing signal. When the write data timing signal is applied to the buffer 25, the buffer 25 opens, causing the results of the arithmetic operation in the logic operation circuit 24 to be transmitted to the video RAM 16 via the data bus 12 and to be written into the video RAM 16. At the same time, the write data timing signal is also applied to bidirectional transfer buffers 37 via an inverted 35. Thus, the buffers 37 close to interrupt data output by the CPU 10.

The timing generator 36 is constructed as a combined logic element and produces the above read data timing signal and write data timing signal in response to outputs from a counter 38. The counter 38 counts clock pulses from a clock output terminal E of the CPU 10. The counting operation of the counter 38 starts when a count enable signal is applied from a D flip-flop 40. The D flip-flop 40 receives coincidence output from a comparator 42 as a clock and receives Q output from a D flip-flop 44 as input data. The D flip-flop 44 responds to the clock from the CPU 10. The clear input terminal of the D flip-flop 44 received a last instruction cycle (LIC) signal from the CPU 10, which is produced every time the last instruction appears. Thus, the D flip-flop 44 is cleared and the Q output thereof changes to the L (low) level from the H (high) level when the LIC signal is generated.

The comparator 42 monitors the data bus 12 to indicate the appearance of a predetermined instruction code which is stored in a reference code setting circuit 46. When it appears, the above-mentioned coincidence output is applied to the D flip-flop 40. The predetermined instruction code is one of a plurality of instruction codes in an operation instruction set which requires the CPU 10 to read data from the video RAM 16 or to write data in the video RAM 16. The instruction codes are stored in a program memory 47 which also stores programs for the CPU 10. In the embodiment of FIG. 1, the predetermined instruction code has been selected to be the arithmetic shift left (ASL) code which instructs a shift of data toward the left by one bit. If the ASL code is in an instruction, for example, ASL $50FF, it means to execute the arithmetic shift left operation with respect to data in an address of $50FF. The comparator 42 is enabled to operate when the Q output of a D flip-flop 48 applies the H level to the enable input terminal of the comparator 42. The D flip-flop 48 produces an H level Q output when a predetermined address is decoded by a decoder 50. The decoder 50 and the D flip-flop 48 are provided in order to inhibit the comparator 42 from operating when data having the same content as the ASL code appears and when only an original ASL instruction should be executed by the data processing system.

Figure 2:
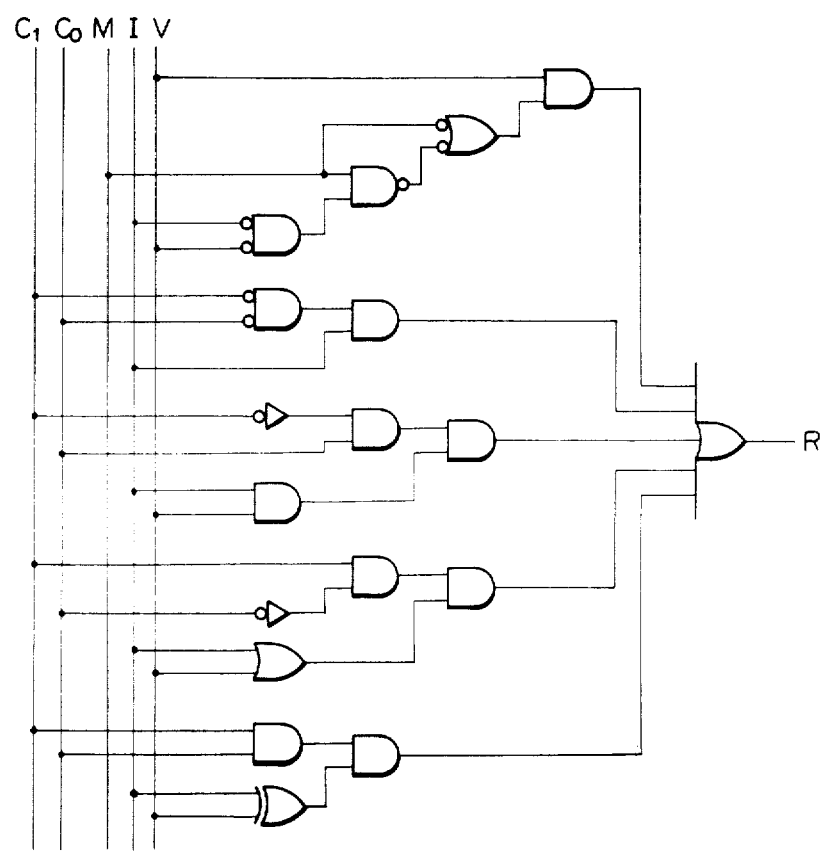
FIG. 2 is the block diagram of a logic operation circuit in FIG. 1.

FIG. 2 illustrates an example of the logic operation circuit 24 in FIG. 1. In FIG. 2, only a part of the logic operation circuit, which processes one bit of data is illustrated. Eight such circuits are necessary to process eight-bit data. According to the circuit of FIG. 2, one of four arithmetic operations is executed in accordance with the two bits of selection data $C_0$ and $C_1$ from the selection register 26. The relation between the selection data bits $C_0$ and $C_1$ and the arithmetic operation is as shown in Table 1.

TABLE 1

| $C_1$ | $C_0$ | Arithmetic operation |
|---|---|---|
| 0 | 0 | PSET |
| 0 | 1 | AND |
| 1 | 0 | OR |
| 1 | 1 | EOR |

In Table 1, PSET indicates a point set-operation for setting a point to one position. In fact, the image data I appears without change at the output R of the logic operation circuit when a mask operation is not executed, that is, when the mask data M is "0" during a PSET operation. FIG. 3(A) illustrates a logical diagram of the PSET operation, and Table 2 is a truth table of the PSET operation.

Next, AND indicates a logical product operation. According to this operation, a logical product of the image data I and the video RAM data V appears at the output R when the mask operation is not executed, that is, when the mask data M is "0". FIG. 3(b) illustrates a logical diagram of the AND operation, and Table 3 is a truth table of the AND operation.

Further, OR indicates a logical add operation whereby a logical add of the image data I and the video RAM data V appears at the output R when the mask operation is not carried out, that is; when the mask data M is "0". FIG. 3(c) and Table 4 correspond to this operation.

Finally, EOR indicates an exclusive OR operation, whereby an exclusive OR of the image data I and video RAM data V appears at the output R when the mask data is "0". FIG. 3(d) and Table 5 correspond to this operation.

TABLE 2

| PSET | | | |
|---|---|---|---|
| M | I | V | R |
| 0 | 0 | 0 | 0 |
| 0 | 0 | 1 | 1 |
| 0 | 1 | 0 | 0 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

TABLE 3

| AND | | | |
|---|---|---|---|
| M | I | V | R |
| 0 | 0 | 0 | 0 |
| 0 | 0 | 1 | 1 |
| 0 | 1 | 0 | 0 |
| 0 | 1 | 1 | 1 |
| 1 | 0 | 0 | 0 |
| 1 | 0 | 1 | 0 |
| 1 | 1 | 0 | 0 |
| 1 | 1 | 1 | 1 |

TABLE 4

| OR | | | |
|---|---|---|---|
| M | I | V | R |
| 0 | 0 | 0 | 0 |
| 0 | 0 | 1 | 1 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

TABLE 5

| EOR | | | |
|---|---|---|---|
| M | I | V | R |
| 0 | 0 | 0 | 0 |
| 0 | 0 | 1 | 1 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |

TABLE 5-continued

| EOR | | | |
|---|---|---|---|
| M | I | V | R |
| 1 | 1 | 1 | 0 |

Figure 4:
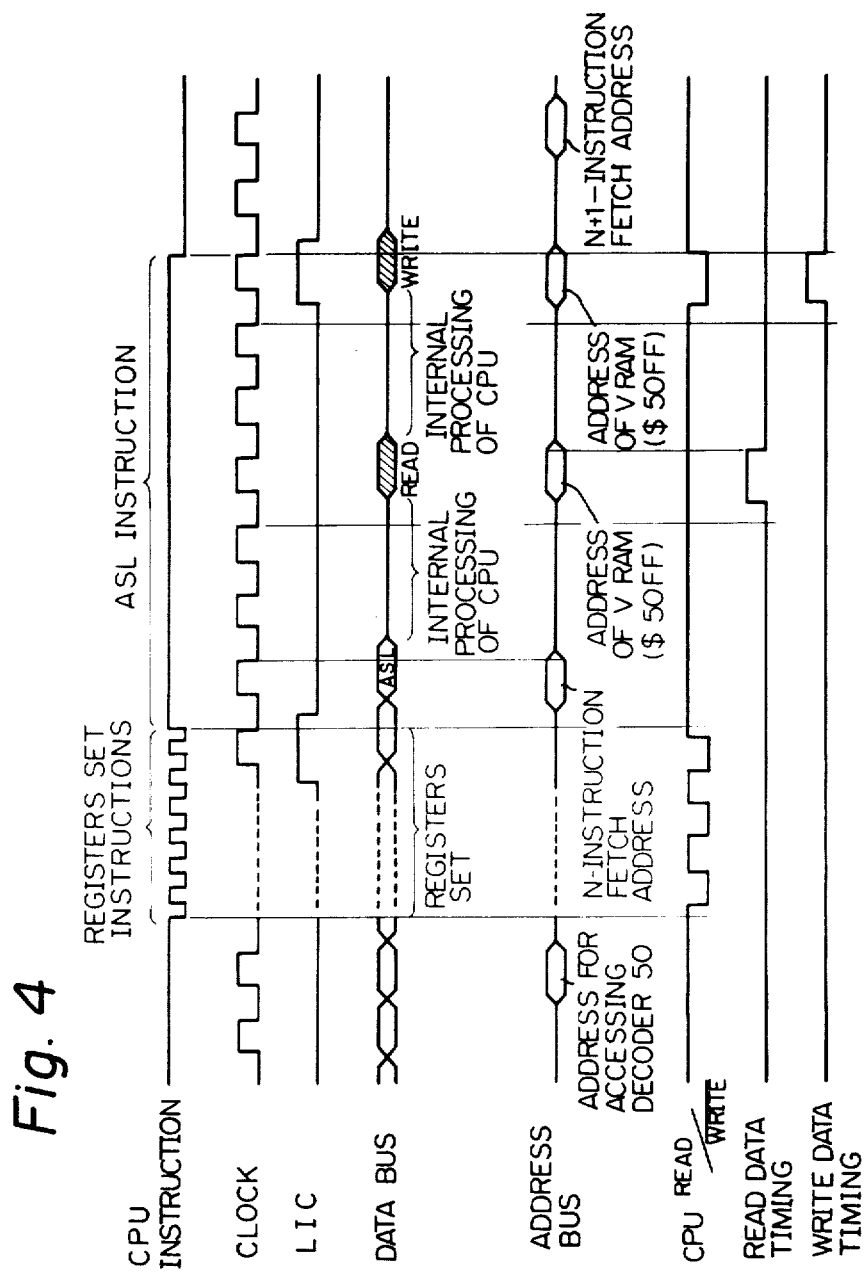
FIG. 4 is a timing chart of the embodiment in FIG. 1.

Hereinafter the operation of the embodiment of FIG. 1 will be described. As shown in FIG. 4, when a predetermined address which triggers the decoder 50 appears on the address bus 14, the decoder 50 decodes this and thus the D flip-flop 48 is set, placing the comparator 42 in an enabled condition. Accordingly, the comparator 42 starts to monitor whether the ASL instruction is fetched.

Before the ASL instruction, as shown in FIG. 4, several instructions for setting the registers are fetched. Thus, the selection register 26, mask register 28, and image register 30 receive their respective data. With the last register set instruction, an LIC code is produced, causing the Q output of the D flip-flop 44 to change to the L level.

After the LIC code is produced, when the ASL code is fetched from the program memory 47, a coincidence output is applied from the comparator 42 to the D flip-flop 40, causing the $\overline{Q}$ output of the D flip-flop 40 to change to the H level, whereby the counter 38 starts counting. Simultaneously, the CPU 10 executes the ASL instruction. If the ASL instruction is, for example, "ASL$50FF", and ASL operation is executed with respect to data in the video RAM 16 at an address corresponding to the operand "$50OFF" of the ASL instruction. In FIG. 4, "internal processing of CPU" corresponds to this operation. As illustrated in FIG. 4, an address of the video RAM 16 is output by the CPU 10. Thus, the contents of the accessed address of the video RAM 16 appear on the data bus 12. At this time, the read data timing signal is output from the timing generator 36 to the V-RAM register 34 so it will store the data on the data bus 12, which was read from the address of $50FF in the video RAM 16. Then, the arithmetic operation described before is executed in the logic operation circuit 24 and the result R is obtained. It can be determined in advance when (after how many clock cycles) the read address and write address are produced from the CPU 10 after the ASL code is produced. Therefore the counter 38 is designed so that the read data timing signal and the write data timing signal are produced after the same number of clock cycles as the read address and the write address, respectively.

After several clock cycles, the CPU 10 again accesses the address of $50FF in the video RAM 16 to write the result of the original ASL instruction as illustrated in FIG. 4. Simultaneously, as illustrated in FIG. 4, the write data timing signal is output from the timing generator 36 to the buffers 25 and 37 to open the buffer 25 and to close the buffer 37. Thus, the output from the logic operation circuit 24 is written in the addressed position (address of $50FF) in the video RAM 16 instead of the data from the CPU 10.

As described hereinbefore, according to the prior art, one arithmetic operation takes at least one instruction cycle for reading data from the video RAM, at least several instruction cycles for executing the arithmetic operation, and at least one instruction cycle for writing the result of the arithmetic operation in the video RAM. However, according to the present invention, the same process can be performed within one instruction cycle of, for example, the ASL instruction. Therefore, the present invention can generate and modify graphic data for display on a CRT at a much higher speed than the prior art.

The above-described high-speed processing according to the present invention is made possible not only by the fact that the arithmetic operation is performed by a logic operation circuit provided separately from the CPU but also by the fact that the CPU operates and executes the ASL instruction during the arithmetic operation of the logic operation circuit and the operand of the ASL instruction corresponds to the address in the video RAM to be accessed. If the CPU had to stop its processing during the arithmetic operation of the logic operation circuit in order to open the data bus to the logic operation circuit, considerable hardware for stopping the operation of the CPU would be necessary. Furthermore, the CPU would have to execute additional programs for preparing to stop the CPU and for returning the CPU from a waiting condition to an operating condition. The latter requirement prevents high-speed processing of the system. Since the operand of the ASL instruction is used for the address in the video RAM, hardware and instructions for producing an address for accessing the video RAM can be omitted.

Many variations in the above embodiment are possible. For example, in the above-mentioned embodiment, the arithmetic operation with respect to data in the video RAM is carried out while the CPU executes the ASL instruction. According to the present invention, however, another instruction which reads and writes data in the video RAM can be used instead of the ASL instruction. If a main program is written so that the operand of the ASL instruction stored in the program memory 47 can be changed, the above arithmetic operation can be executed on a plurality of data at different addresses. If the main program is written so that the operand of the ASL instruction is changed by data input from a keyboard, the operator can select any address in processing by an video RAM for the arithmetic operation. Many different kinds of arithmetic operations can, of course, be performed according to the present invention without being limited to the specific arithmetic operations, in the above embodiment. The present invention is, in particular, effective for a graphic display on a CRT using a personal computer having a small processing capacity, wherein a part of one graph is to be superimposed upon another graph already displayed on the CRT.

Figure 5A:
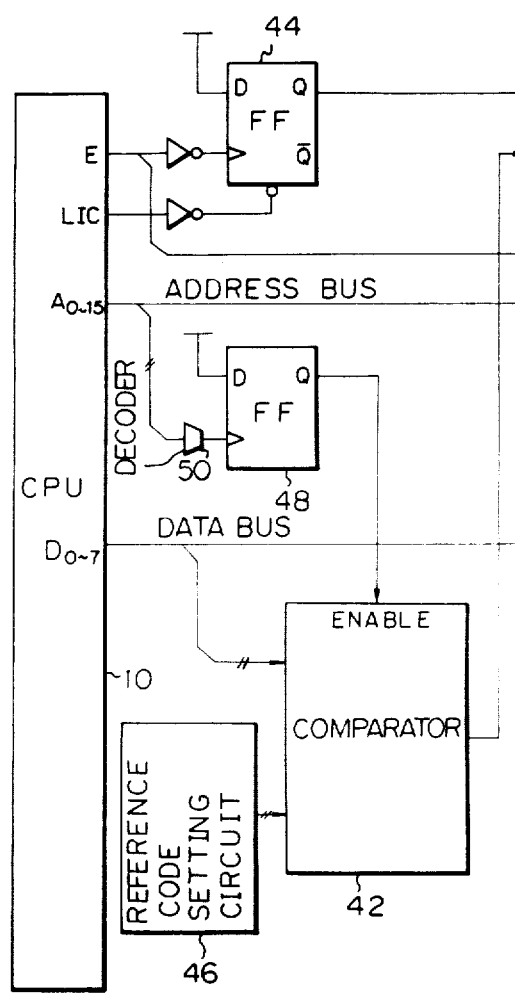
FIGS. 5a and 5b are a block diagram of another embodiment of the present invention.
Figure 5B:
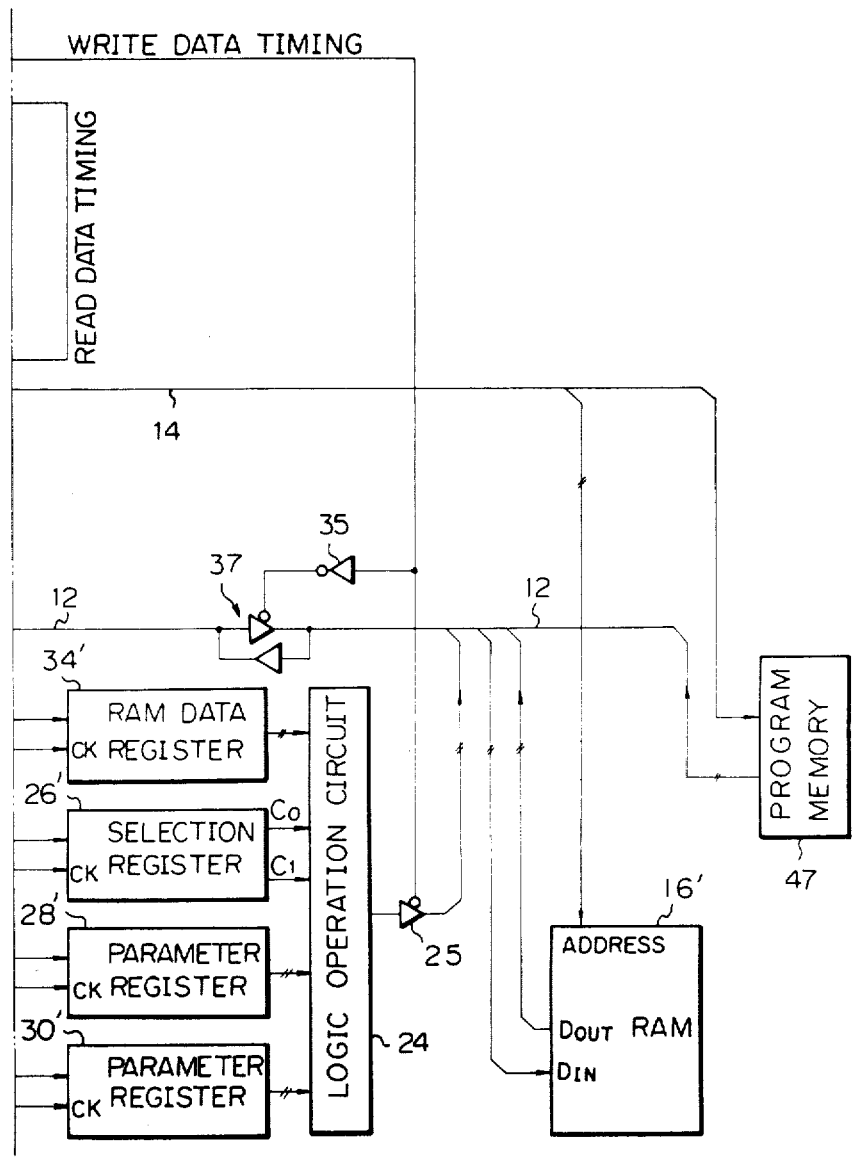

FIG. 5 illustrates another embodiment of the present invention. While the embodiment of FIG. 1 relates to a graphic display system, the embodiment of FIG. 5 relates to a general purpose data processing system. Therefore, instead of the video RAM 16 in FIG. 1, a general RAM 16' is provided in this embodiment. The CRT scanning address generator 20, multiplexer 18, and CRT interface circuit 22 in FIG. 1 are omitted in this embodiment. Furthermore, instead of the V-RAM register 34, mask register 28, and image register 30, a RAM register 34' and parameter registers 28' and 30' are provided. The parameter registers 28' and 30' hold parameter data used in arithmetic operations. Otherwise, the construction and operation of this embodiment are the same as in the embodiment of FIG. 1.

Many widely different embodiments of the present invention may be constructed without departing from the spirit and scope of the present invention. It should be understood that the present invention is not limited to the specific embodiments described in this specification, except as defined in the appended claims.

We claim:

1. A data processing apparatus, comprising:
   a central processing unit for executing a plurality of instruction codes;
   a data bus connected to said central processing unit;
   memory means, connected to said data bus, for storing data received from said central processing unit via said data bus;
   identification means, connected to said data bus, for identifying a predetermined instruction code from the plurality of instruction codes, the predetermined instruction code requiring said central processing unit to access said memory means; and
   logic operation means, connected to said data bus, said central processing unit and said identification means, for operating on data when the predetermined instruction code is identified, by receiving data from said memory means via said data bus, executing a first operation using the received data to produce data, and writing the produced data in said memory means, said logic operation means receiving, executing and writing while said central processing unit is executing a second operation as instructed by the predetermined instruction code, thereby completing the first operation in less time than said central processing unit would take to complete the first operation.

2. An apparatus as claimed in claim 1, wherein said logic operation means writes the produced data in said memory means in place of data resulting from the second operation in said central processing unit.

3. An apparatus as claimed in claim 2, wherein said logic operation means comprises means, connected to said data bus and said logic operation means, for inhibiting data resulting from the second operation in said central processing unit from being written into said memory means.

4. An apparatus as claimed in claim 1, wherein the first operation executed by said logic operation means includes an arithmetic operation on the received data from said memory means and on additional data from said central processing unit.

5. An apparatus as claimed in claim 4, wherein said logic operation means comprises:
   first register means, connected to said data bus, for storing the received data read by said central processing unit from said memory means;
   second register means, connected to said data bus, for storing the additional data from said central processing unit; and
   a logic operation circuit, connected to said data bus and said first and second register means, for executing the arithmetic operation on the received and additional data in said first and second register means, respectively.

6. An apparatus as claimed in claim 5, wherein said central processing unit generates a selection signal and said logic operation means further comprises a third register means, connected to said data bus and said logic operation circuit, for storing the selection signal from said central processing unit, said logic operation circuit selecting one of a plurality of arithmetic operations in dependence upon the selection signal and executing the selected arithmetic operation on the received and additional data in said first and second register means, respectively.

7. An apparatus as claimed in claim 1, wherein said central processing unit generates a selection signal and said logic operation means comprises means, connected to said data bus, for selecting one of a plurality of arithmetic operations to be executed in dependence upon the selection signal from said central processing unit.

8. An apparatus as claimed in claim 1, wherein said central processing unit executes instructions in instruction cycles and said logic operation means comprises means, connected to said central processing unit and said identification means, for producing a read data timing signal indicating when said logic operation means is to receive the received data from said memory means via said data bus and a write data timing signal indicating when said logic operation means is to write the produced data in said memory means, within one of the instruction cycles, during which the second operation corresponding to the predetermined instruction code is executed by said central processing unit.

9. A data processing apparatus, comprising:
   a central processing unit for executing a plurality of instruction codes;
   a data bus connected to said central processing unit;
   a video memory means, connected to said data bus, for storing data received from said central processing unit via said data bus;
   identification means, connected to said data bus, for identifying a predetermined instruction code from the plurality of instruction codes, the predetermined instruction code requiring said central processing unit to access said video memory means; and
   logic operation means, connected to said data bus, said central processing unit and said identification means, for operating on data when the predetermined instruction code is identified, by receiving data from said video memory means via said data bus, executing a first operation using the received data to product data, and writing the produced data in said video memory means, said logic operation means receiving, executing and writing while said central processing unit is executing a second operation as instructed by the predetermined instruction code, thereby completing the first operation in less time than said central processing unit would take to complete the first operation.

10. An apparatus as claimed in claim 9, wherein said logic operation means writes the produced data in said video memory means in place of data resulting from the second operation in said central processing unit.

11. An apparatus as claimed in claim 10, wherein said logic operation means comprises means, connected to said data bus and said logic operation means, for inhibiting data resulting from the second operation in said central processing unit from being written into said video memory means.

12. An apparatus as claimed in claim 9, wherein the first operation executed by said logic operation means includes an arithmetic operation on the received data from said video memory means and on additional data from said central processing unit.

13. An apparatus as claimed in claim 12, wherein said logic operation means comprises:
   first register means, connected to said data bus, for storing the received data read by said central processing unit from said video memory means;

second register means, connected to said data bus, for storing the additional data from said central processing unit; and a logic operation circuit, connected to said data bus and said first and second register means, for executing the arithmetic operation on the received and additional data in said first and second register means, respectively.

14. An apparatus as claimed in claim 13, wherein said central processing unit generates a selection signal and said logic operation means further comprises a third register means, connected to said data bus and said logic operation circuit, for storing the selection signal from said central processing unit, said logic operation circuit selecting one of a plurality of arithmetic operations in dependence upon the selection signal and executing the selected arithmetic operation on the received and additional data in said first and second register means, respectively.

15. An apparatus as claimed in claim 13, wherein the additional data includes image and mask data and said second register means comprises two registers, connected to said data bus, for storing the image and mask data from said central processing unit, said logic operation circuit executing an arithmetic operation on the received data stored in said first register means and the image and mask data stored in said two registers.

16. An apparatus as claimed in claim 9, wherein said central processing unit generates a selection signal and said logic operation means comprises means, connected to said data bus, for selecting one of a plurality of arithmetic operations to be executed in dependence upon the selection signal from said central processing unit.

17. An apparatus as claimed in claim 9, wherein said central processing unit executes instructions in instruction cycles and said logic operation means comprises means, connected to said central processing unit and said identification means, for producing a read data timing signal indicating when said logic operation means is to receive the received data from said video memory means via said data bus and a write data timing signal indicating when said logic operation means is to write the produced data in said video memory means, within one of the instruction cycles, during which the second operation corresponding to the predetermined instruction code is executed by said central processing unit.

18. A data processing appartus, comprising:
a computer, including:
a central processing unit, having an instruction set, for executing an instruction by operating on associated data to produce first resultant data; and
a memory for storing the instruction, the associated data, and the first resultant data; and
arithmetic means, connected to said central processing unit and said memory in said computer, for performing an arithmetic operation, not included in the instruction set of said central processing unit, during execution of the instruction, on the associated data to produce second resultant data, for suppressing storage of the first resultant data and for storing the second resultant data in the memory where said first resultant data was to be stored.

19. A data processing apparatus, comprising:
a computer, including:
a central processing unit, having an instruction set for executing an instruction by operating on associated data to produce first resultant data; and
a memory for storing the instruction, the associated data and the first resultant data; and
arithmetic means for performing an arithmetic operation, during execution of the instruction, on the associated data to produce second resultant data, including:
an address bus connected to the central processing unit and the memory;
a data bus connected to the central processing unit and the memory;
comparator means, connected to said data bus and the central processing unit, for identifying the instruction;
timing means, connected to the central processing unit and said comparator means, for generating read data and write data timing signals indicating when the central processing unit is reading the associated data from the memory and sending the first resultant data to the memory, respectively;
a first decoder connected to said address bus;
a data register connected to said data bus and said timing means to receive the read data timing signal and the associated data;
selection, and first and second parameter registers connected to said data bus and said first decoder;
a logic operation circuit, connected to said data, selection and first and second parameter registers, for performing the arithmetic operation;
a buffer, connected to said data bus, said logic operation circuit and said timing means to receive the write data timing signal, for providing the second resultant data to the memory to be stored where the first resultant data was to be stored;
a first inverter connected to said timing means to receive the write data timing signal; and
transfer buffers, connected to said data bus and said first inverter, for suppressing the writing of the first resultant data in dependence upon the write data timing signal as inverted by said inverter.

20. A data processing apparatus as claimed in claim 19, wherein said comparator means comprises:
a second decoder connected to the address bus;
a first flip-flop connected to said decoder;
a reference code setting circuit for indicating an operation code associated with the instruction;
a comparator, connected to said data bus, said timing means, said first flip-flop and said reference code setting circuit, for comparing data on said data bus with the operation code.

21. A data processing apparatus as claimed in claim 20, wherein said timing means comprises:
second and third inverters connected to the central processing unit;
a second flip-flop connected to said second and third inverters;
a third flip-flop connected to said comparator and said second flip-flop;
a counter, connected to the central processing unit and said third flip-flop, for counting the clock signals generated by the central processing unit after said comparator has identified the instruction; and
a timing generator, connected to said counter, said data register, said buffer and said first inverter, for generating the read data and write data timing signals.

22. A data processing apparatus as recited in claim 21, wherein the memory includes a program memory and a video memory, and said apparatus further comprises:
  a cathode ray tube interface circuit connected to the video memory;
  a multiplexer connected to the video memory and said address bus; and
  a cathode ray tube scanning address generator connected to said multiplexer.

23. A data processing apparatus as claimed in claim 19, wherein said logic operation circuit provides logical operations including OR, exclusive OR, AND and masking capabilities.

* * * * *

UNITED STATES PATENT AND TRADEMARK OFFICE
CERTIFICATE OF CORRECTION

PATENT NO. : 4,574,347
DATED : March 4, 1986
INVENTOR(S) : Mori et al.

It is certified that error appears in the above-identified patent and that said Letters Patent is hereby corrected as shown below:

```
Column 1, line 16                         "of data"
should be --on data--;
          line 40, after "CPU" insert --to--;
          line 41, delete "to".
Column 2, line 29, delete "in response";
          line 68, "inverted" should be --inverter--.
Column 3, line 14, "received" should be --receives--.
Column 6, line 40, "processing by an video RAM for the"
should be --the video RAM for processing by an--.
Column 8, line 40, "product" should be --produce--.
```

Signed and Sealed this

Nineteenth Day of August 1986

[SEAL]

Attest:

DONALD J. QUIGG

Attesting Officer

Commissioner of Patents and Trademarks